Oct. 24, 1950 W. R. PARSON 2,527,373
CONDENSER
Filed Jan. 21. 1947 2 Sheets-Sheet 1

INVENTOR.
William R. Parson
BY
ATTORNEYS

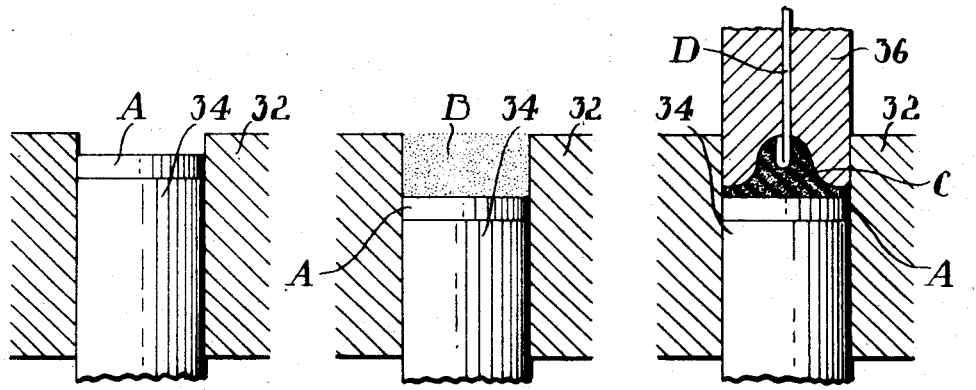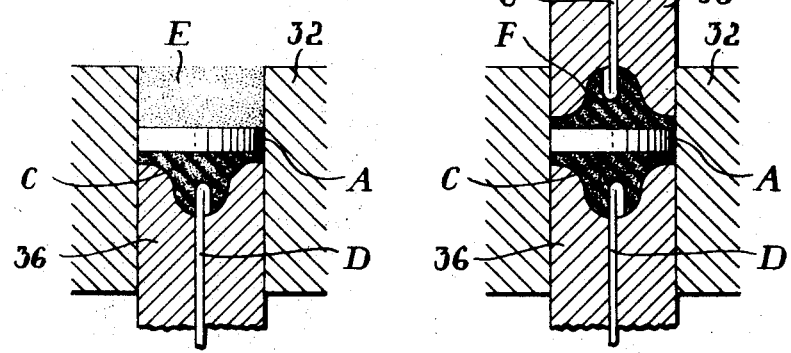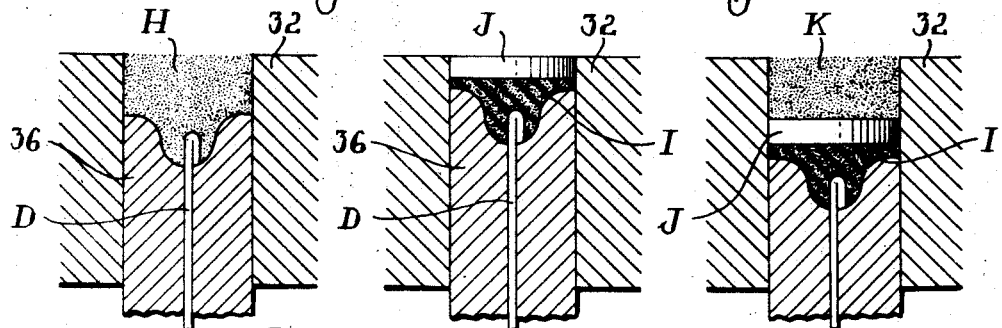

Patented Oct. 24, 1950

2,527,373

UNITED STATES PATENT OFFICE 2,527,373

CONDENSER

William R. Parson, Du Bois, Pa., assignor to Jeffers Electronics, Inc., Du Bois, Pa., a corporation of Pennsylvania Application January 21, 1947, Serial No. 723,228

3 Claims. (Cl. 175—41)

This invention relates to an electrical condenser and particularly to a condenser of small size adapted for use in high frequency electrical circuits.

In ultra high frequency apparatus it is of major importance to keep lead lengths connecting the various components as short as possible and in general to make the apparatus as compact as possible except for the particular conductors or other elements the dimensions of which may determine the desired performance characteristics. It is the general object of the present invention to produce a condenser of very small size but of relatively high capacity and capable of withstanding high voltages which are frequently involved in ultra high frequency apparatus.

A further object of the invention is the provision of a condenser which may be made very inexpensively and in particular in a multiple cavity mold so that a large number of condensers may be similarly formed in a single mechanical molding operation.

These and other objects of the invention will become apparent from the following description read in conjunction with the accompanying drawing in which.

Figure 1:
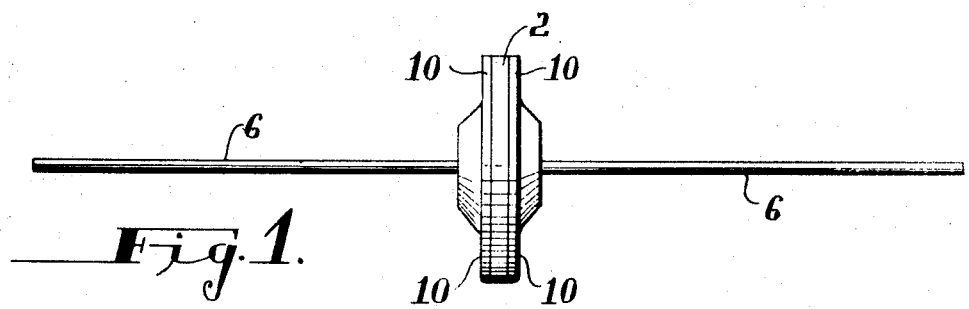
Figure 1 is an elevation showing the improved condenser.
Figure 6:
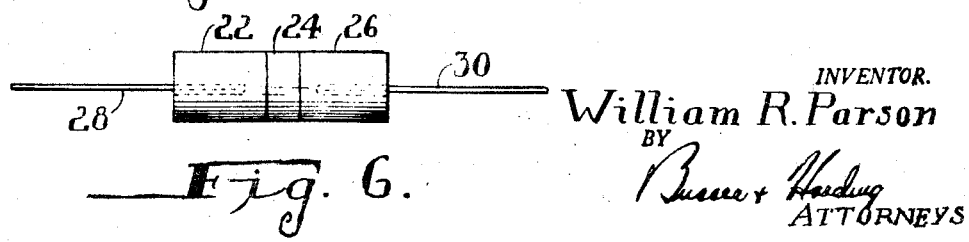

Figures 4A to 4E, inclusive, are sectional diagrams illustrating the formation of condensers using powdered conductive material;

Figures 5A to 5C, inclusive, are similar diagrams illustrating some alternative steps in condenser formation; and Figure 6 is an elevation similar to Figure 1 but showing a condenser of quite small size.

Figure 2:
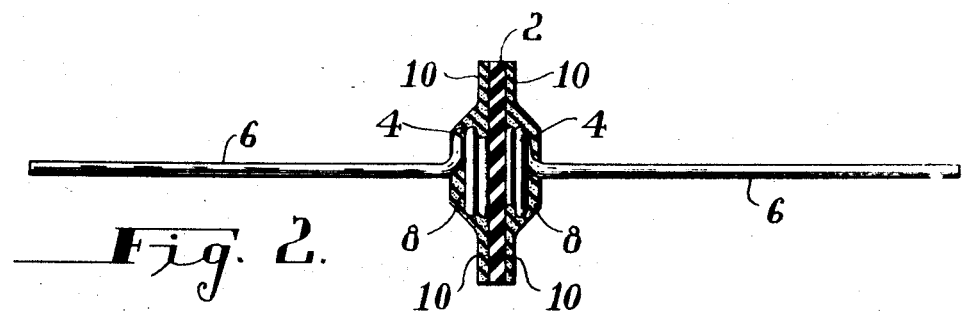
Figure 2 is an axial section through the same illustrating its internal construction.

Referring first to Figures 1 and 2 the condenser comprises a dielectric disc 2 which may be of any suitable material capable of giving the capacity and dielectric values which are desired. This disc, for example, may be of any one of the commonly used ceramic dielectrics or it may be of glass or, where the voltage requirements are lower, it may be formed of a thermosetting resin such as a phenol-formaldehyde resin with or without an insulating filler. It has been found that excellent dielectric characteristics may be secured by cold molding, into the form of a disc, a mixture of titanium dioxide or barium or other heavy metal titanate or other ceramic powder of good dielectric characteristics with just sufficient phenol-formaldehyde resin to provide a binder. Thermoplastic resins may also be used for the formation of this dielectric disc though best results are secured by the use of a dielectric capable of withstanding elevated temperatures involved in the baking of conductive resinous elements as hereafter described.

Bonded to the opposite faces of this disc are conductive plastic elements indicated at 8 embedded in which are the heads 4 of leads 6. The elements 8 consist preferably of thermosetting resin such as phenol-formaldehyde resin containing graphite or other form of carbon or other conducting material rendering the elements as a whole substantially conductive. In general, compositions may be used corresponding to those commonly involved in molded resistors of low resistance values. Here again thermoplastic rather than thermosetting resins may be used to form the matrices for conductive particles of carbon or the like.

The leads 6 may be formed of tinned copper wire, the tinning making them easily solderable to other elements of a circuit. The heads 4 are preferably provided in the form of one or more complete turns of the wire, the end turns of the leads being then adapted to abut the dielectric disc and provide sufficient area to give an effective quite low resistance to the condenser constituted by the assemblies of the lead heads and the conductive plastic elements. In order to save on the bulk of the structure a minimum of conductive plastic material may be used, for example, just sufficient to embed the lead heads, the conductive elements being provided with quite thin flanges as indicated at 10 extending to the periphery of the disc. In cases where high voltages are encountered flashover may be prevented by terminating the conductive material substantially inward of the periphery of the dielectric disc. If it is desired to provide insulation the assembly may be coated either with an insulating lacquer or embedded as a unit, except for the projecting leads, in a surrounding body of insulating thermoplastic resin. Various other considerations leading to superior condensers will be discussed later following disclosures of methods of condenser formation.

Figure 3:
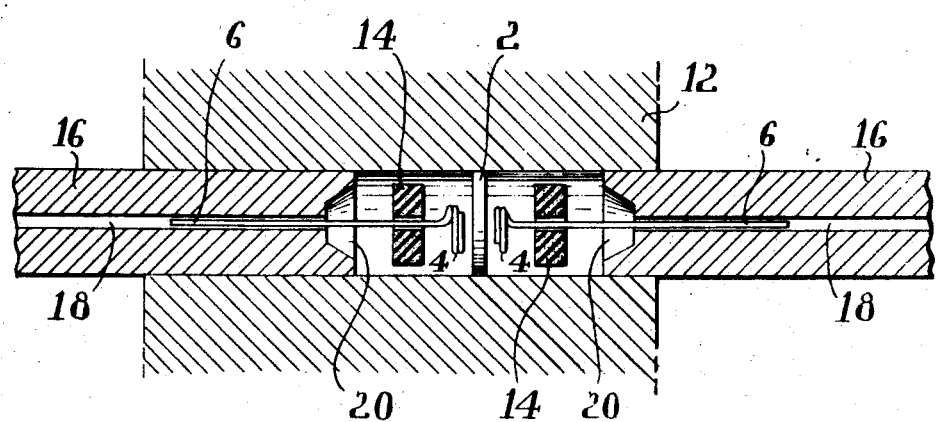
Figure 3 is a diagrammatic section illustrating one mode of formation of the condenser using preforms of conductive plate-forming material.

One method of forming the improved condenser will be evident from Figure 3. The dielectric discs 2 may be located in openings of a multiple cavity mold indicated at 12. Plungers 16 entering the opposite ends of the cavities have bores 18 receiving the leads 6 on which are threaded perforated wafers 14 formed by cold preliminary compression of the desired mixture of resin and conductive material. The inner ends of the plungers 16 are provided with the cavities 20 of a suitable shape to form the desired contours of the condenser. By the application of pressure the wafers 14 are caused to flow about and into the interior of the coiled heads 4 of the leads and against the discs 2 which, if of molded type, may be further compressed, and will in any case become firmly bonded to the conductive material of the wafers 14. By the application of sufficient pressure the resulting compressed assembly will have sufficient mechanical strength to retain the condition attained during the compression so that the condensers may be removed and baked to set the resin or resins and thus form a final condenser of high mechanical strength.

An alternative method of forming condensers, particularly adapted to the formation of small size condensers is indicated in Figures 4A to 4E, inclusive. A multiple cavity mold 32 has a plunger 34 located therein and on this there may be placed either a ceramic or other preformed dielectric disc, for example of the type previously mentioned, or there may be placed in the upper end of the hole above the plunger a powder of dielectric qualities which when compressed is sutable for the formation of the condenser dielectric. In the latter case compression by an upper plunger will serve to form a disc after which the top punch or plunger is removed leaving the disc A in the position illustrated in Figure 4A.

The lower plunger is then located at a proper height and the region in the hole above the disc A is filled with powder B of the type adapted to form the conductive plates of the condenser, i. e., a mixture such as previously mentioned of a thermosetting resin and carbon. The location of the plunger and disc with relation to the tube of the mold will determine how much powdered material can be received in the opening and hence uniformity can be easily achieved.

A conductor wire D having a head of hook, upset or helical type is located in the bore of an upper plunger 36 and this plunger is brought down to compress the conductive mixture into a button embedding the head of the lead wire and adhering to the dielectric disc.

As indicated in Figure 4D, the dye is now inverted and the upper punch or plunger 36, now in lower position, is moved upwardly to provide the space of proper volume for reception of more conductive powder E.

A plunger 38 similar to 36 and carrying a lead wire is then inserted in the now upper end of the mold and caused to compress the powder E into a button F on the side of the dielectric disc A opposite the button C. This condition is illustrated in Figure 4E. The condenser is now finished except for baking and possibly some other treatments as indicated herein.

Still another alternative method is illustrated in Figures 5A to 5C, inclusive, to be followed to complete the operation by what is illustrated in Figure 4E. In this method conductive material H is filled in on top of a punch 36 carrying the terminal lead D so as to fill the mold covering the head of the terminal. A flat punch is then lightly pressed on the powder to form the button I illustrated in Figure 5B. As also illustrated in that figure a preformed disc of resin-bonded titanium dioxide or titanates or a ceramic disc is placed on top of the conductive material. Alternatively, a mixture of thermosetting resin powder and titanium dioxide or a heavy metal titanate may be filled in on top of the button I and lightly pressed with a flat punch to provide the disc J.

Following this the punching operation with the top punch is so carried out as to lead it to J below the upper surface of the mold so that conductive powder K may be filled in above. As will be evident by comparing Figures 5C and 4D, the same phase of the molding operation is reached in both of the alternative sequences and the molding may be finished as described above in connection with Figure 4E.

Figure 6 illustrates a modification of the condenser structure provided in accordance with the invention which is found particularly useful for condensers of small capacity and small physical size. A cylindrical body comprises the three sections 22, 24 and 26 integrally molded together, the sections 22 and 25 consisting of conductive compositions such as has been described as constituting the conductive elements 8 of the condenser previously described. The section 24 is a dielectric section which may consist of a dielectric composition similar to that described as constituting the dielectric 2. Lead wires 28 and 30 are embedded in the conductive elements 22 and 26.

The condenser illustrated in Figure 6 may be formed by any of the procedures indicated above merely by providing suitable shapes, in this case flat ends, on the lead carrying plungers.

It will be understood that while the molding of a single condenser has been specifically described the molds 12 or 32 may contain a very large number of cavities so that in a single operation a large number of condensers may be produced. Especially adapted for large quantity production are the methods described in connection with Figures 4A to 4E, inclusive, and 5A to 5C, inclusive.

The best type of condenser is achieved if there is used a ceramic disc as the dielectric. When a ceramic disc is used the best conditions of both bonding and high capacity for minimum size are achieved if the exposed surfaces of the ceramic disc are coated with a good conductive material. This end may be achieved by copper spraying the surfaces, by painting with aqueous carbon emulsion, by deposition of carbon or by coating with silver. The coating with silver may be effected in conventional fashion by painting or spraying with a commercial silver coating material consisting of a substance which, at a high firing temperature, deposits metallic silver in an electrically continuous conductive coating. The carbon deposition referred to is carried out by heating the ceramic discs at high temperature in hydrocarbons or other carbonaceous vapors. This method of carbon deposition is also well known per se and results in a carbon deposit which is conductive. Carbon deposition constitutes the best method of procedure. After coating the ceramic in this fashion the conductive buttons of thermosetting resin and conductive carbon or the like adhere quite well to the disc after baking. The adherence may be increased to some extent if prior to molding the surfaces of the disc are coated with resin in solution.

The condensers of the type described above may be impregnated by conventional vacuum and pressure impregnation with moisture proof materials, such as light waxes, to increase their moisture proof characteristics. However, even without this these molded condensers show practically no change in leakage resistance when subjected to humidity tests. In the case of capacitors formed ordinarily by metallic coatings on ceramic bodies it is quite common for the resistance to drop from 120,000 megohms to 1,000 megohms when they are subjected to humidity tests. Capacitors formed in the fashion described above show substantially no change from the high resistance value just indicated when subjected to the same humidity tests.

Following baking and impregnation (if used) of the described condensers their edges are ground to remove any conductive material which might cover or extend over the edges of the dielectric disc. This material may either be the conductive resin-carbon mixture or it may be the conductive coating on the ceramic disc consisting of copper, silver or carbon resulting from the coating operation. In any case, the grinding insures separation of the conductive portions of the capacitor to an extent equal to the thickness of the disc. Following the grinding operation lacquering or painting of the condensers may take place.

It will be clear from the above that the invention contemplates an electrical condenser comprising a dielectric disc or plate which may be of high dielectric ceramic, glass, or a high dielectric thermoplastic or thermosetting resin provided with conductive members bonded thereto and comprising conductive resin mixtures embedding the ends of leads. As part of the conductive system when ceramic or glass discs or plates are used as the dielectric there may be coated of metal or carbon type which substantially increases the capacity for a given surface and, in particular, promote bonding. As indicated above the condenser unit may be insulated by an exterior coating and may, if desired, be impregnated to decrease its susceptibility to change in the presence of moisture.

What I claim and desire to protect by Letters Patent is:

1. An electrical condenser comprising a dielectric plate having a molded conductive plastic element bonded to each of the opposite faces thereof, each of said elements comprising a mixture including a relatively non-conductive synthetic resinous plastic material and a relatively highly conductive material, and each of said elements having the head portion of a lead embedded therein and supported thereby.

2. An electrical condenser comprising a molded synthetic resinous plastic dielectric plate having a molded conductive plastic element bonded to each of the opposite faces thereof, each of said elements comprising a mixture including a relatively non-conductive synthetic resinous plastic material and a relatively highly conductive material, and each of said elements having the head portion of a lead embedded therein and supported thereby.

3. An electrical condenser comprising a dielectric plate having conductive coatings bonded to each of the opposite faces thereof and having a molded conductive plastic element bonded to the outer face of each of said conductive coatings, each of said elements comprising a mixture including a relatively non-conductive synthetic resinous plastic material and a relatively highly conductive material, and each of said elements having the head portion of a lead embedded therein and supported thereby.

WILLIAM R. PARSON.

REFERENCES CITED

The following references are of record in the file of this patent:

UNITED STATES PATENTS

| Number | Name | Date |
| --- | --- | --- |
| 2,176,604 | Benkelman | Oct. 17, 1939 |
| 2,235,489 | Rath | Mar. 18, 1941 |
| 2,398,088 | Ehlers | Apr. 9, 1946 |
| 2,398,176 | Deyrup | Apr. 9, 1946 |

FOREIGN PATENTS

| Number | Country | Date |
| --- | --- | --- |
| 601,961 | Germany | Aug. 28, 1934 |
| 478,602 | Great Britain | Jan. 21, 1938 |